United States Patent
Kunieda et al.

(10) Patent No.: US 7,094,153 B2
(45) Date of Patent: Aug. 22, 2006

(54) VIRTUAL SPACE CONTROL METHOD

(75) Inventors: Tsuyoshi Kunieda, Saitama (JP); Hiroshi Shiina, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 328 days.

(21) Appl. No.: 10/092,387

(22) Filed: Mar. 6, 2002

(65) Prior Publication Data

US 2002/0128063 A1 Sep. 12, 2002

(30) Foreign Application Priority Data

Mar. 9, 2001 (JP) .............................. 2001-066495
Feb. 20, 2002 (JP) .............................. 2002-042602

(51) Int. Cl.
*A63F 9/24* (2006.01)
(52) U.S. Cl. ....................................................... 463/32
(58) Field of Classification Search ............. 463/31–33
See application file for complete search history.

(56) References Cited

U.S. PATENT DOCUMENTS 5,766,079 A * 6/1998 Kataoka et al. ............... 463/36

6,283,857 B1 * 9/2001 Miyamoto et al. ............ 463/31

FOREIGN PATENT DOCUMENTS

WO   WO95/35140   12/1995

OTHER PUBLICATIONS

Notification of Reason(s) for Refusal mailed Feb. 3, 2005.

* cited by examiner

*Primary Examiner*—Corbett B. Coburn
(74) *Attorney, Agent, or Firm*—Katten Muchin Rosenman LLP (57) ABSTRACT

A program execution apparatus moves the fixation point in a virtual space in response to a change in the direction of a prescribed part of a virtual character in the virtual space. When the program execution apparatus moves the fixation point in a virtual space in response to a change in the direction of a prescribed part of a virtual character in the virtual space, it causes the occurrence of a prescribed object in the virtual space, thereby achieving a video game having a high level of reality and an improved level of entertainment.

25 Claims, 8 Drawing Sheets

VIRTUAL SPACE CONTROL METHOD

This application is related to Japanese Patent Application No. 2001-066495 filed on Mar. 9, 2001, and No. 2002-042602 filed on Feb. 20, 2002, based on which this application claims priority under the Paris Convention and the contents of which are incorporated herein by reference.

BACKGROUND OF THE INVENTION

1. Field of the Invention

The present invention relates to a virtual space control method suitable for a video game as example, to a recording medium in which a virtual space control program is stored, to a program execution apparatus, and to a virtual space control program.

2. Description of the Related Art

Video games have enjoyed widespread use in recent years. These video game machine can execute a game application program obtained from various storage media, such as a CD-ROM or a DVD-ROM, or via various transfer media of communication networks or the like. By doing this, a user can enjoy a variety of games.

Various types of games are available, examples being RPGs (role-playing games), AVG (adventure games), SPG (sports games), and FTG (fighting games).

In this kind of video game, a game program performs playback of prepared motions or change in the attitude or the like of a virtual character (hereinafter referred to as simply a character) in the game. In these video games, a player (game participant) can change the action or behavior of a character by operating a game controller (hereinafter referred to as simply a controller) connected to a video game machine.

An example of a game in which a game program changes the attitude of a character is a so-called soccer game, in which a character dribbling a ball changes his attitude at times to look at the goal.

Among games in which the action or the like of a character is changed by a controller operation, there are games in which a player, by using a controller, not only can change the movement speed and direction of travel of a character, but also can operate alone just one part (element) of the character. An example of this is a game in which a player operates a robot or the like as a character. In the case of this video game, the player can operate the controller, for example, so as to cause the rotation of the upper body of the robot.

In the case of a video game in which the controller can operate on part of a character in this manner, the player can operate a character as he wishes. Therefore, compared with a game in which it is only possible to operate the speed or direction of movement of a character, this game provides a greater sense of reality.

In recent years, however, because there has been a demand for games with even better reality, even a game as described above, in which a part of a character is operable by a controller, cannot be said to be sufficient.

Games to be developed in the future will demand not only the above-noted reality, but also a higher level of entertainment.

SUMMARY OF THE INVENTION

Accordingly, it is an object of the present invention, in consideration of the above-noted problems in the conventional art, to provide a virtual space control method, a storage medium in which is stored a virtual space control program, a program execution apparatus, and a virtual space control program, which achieve in a video game, for example, an improved sense of reality, and which also enable an improved level of entertainment.

The present invention moves the fixation point in the above-noted virtual space, responsive to a change in direction of a predetermined part comprising a virtual character on virtual space.

That is, the present invention, in response to an operation of changing the direction of a predetermined part of a virtual character, changes not the viewpoint of the virtual character, but rather changes a virtual field of view within the game space (so-called camera field of view), thereby enabling rendering of a virtual space that has reality that approaches the real world.

The present invention also generates a prescribed object in the virtual space, if necessary, when the fixation point in the virtual space is moved in response to either movement of or a change in the direction of a prescribed part of a virtual character.

That is, when the movement of a fixation point is linked to a movement or change in the direction of a virtual character, if necessary a prescribed object is generated, thereby achieving a high level of entertainment.

Other and further objects and features of the present invention will become obvious upon understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF THE PREFERRED EMBODIMENTS

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

General Description of a Video Game

In this video game, in response to, for example, operation of a controller or to the generation of a prescribed event described further below, one part (element) of a game character is caused to move and, in response to a change in the direction of the part of the character, a fixation point is caused to move, thereby a virtual field of view (not of the character, but of the camera) in the game space being caused to move. Details of the configuration and functions of a video game machine and the controller thereof for achieving this video game are presented later.

Figure 1:
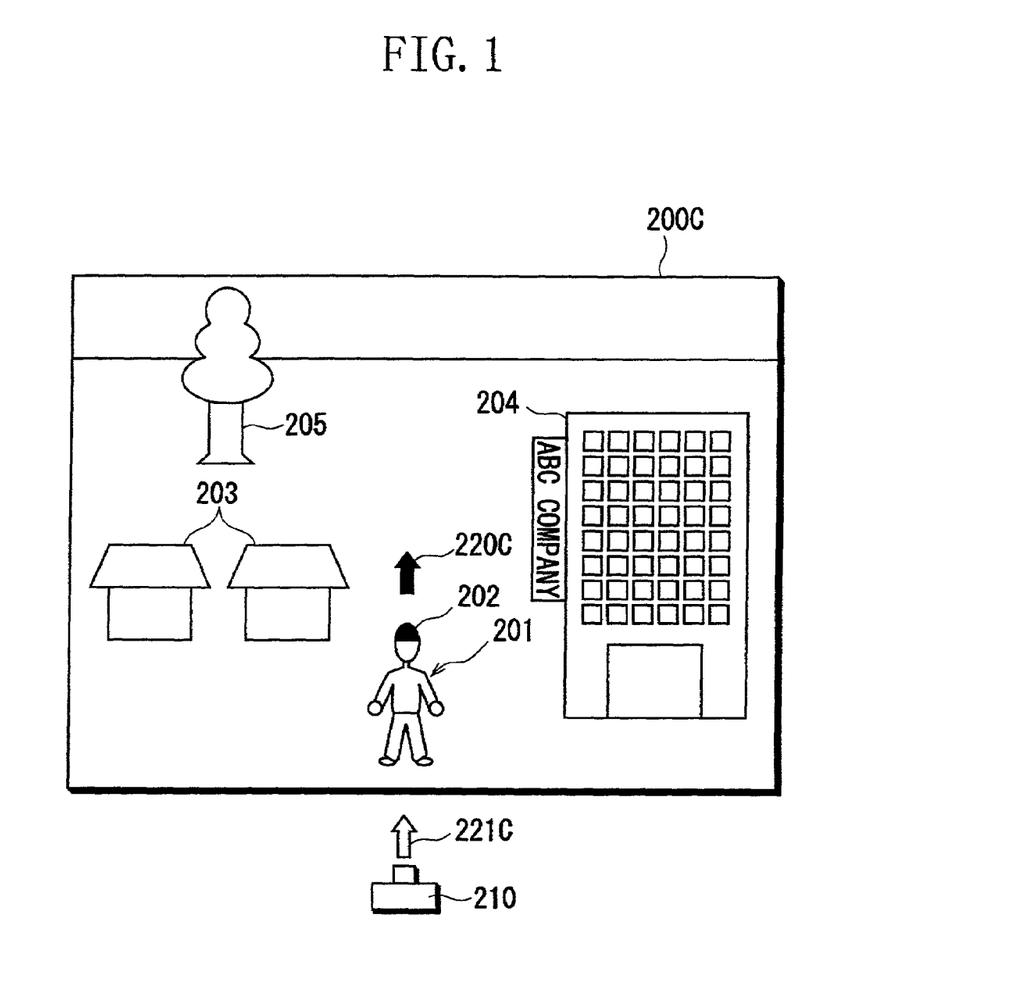
FIG. 1 is a drawing showing an example of a video game screen of the condition in which the head object part of a character faces the same direction as the front of the character.
Figure 2:
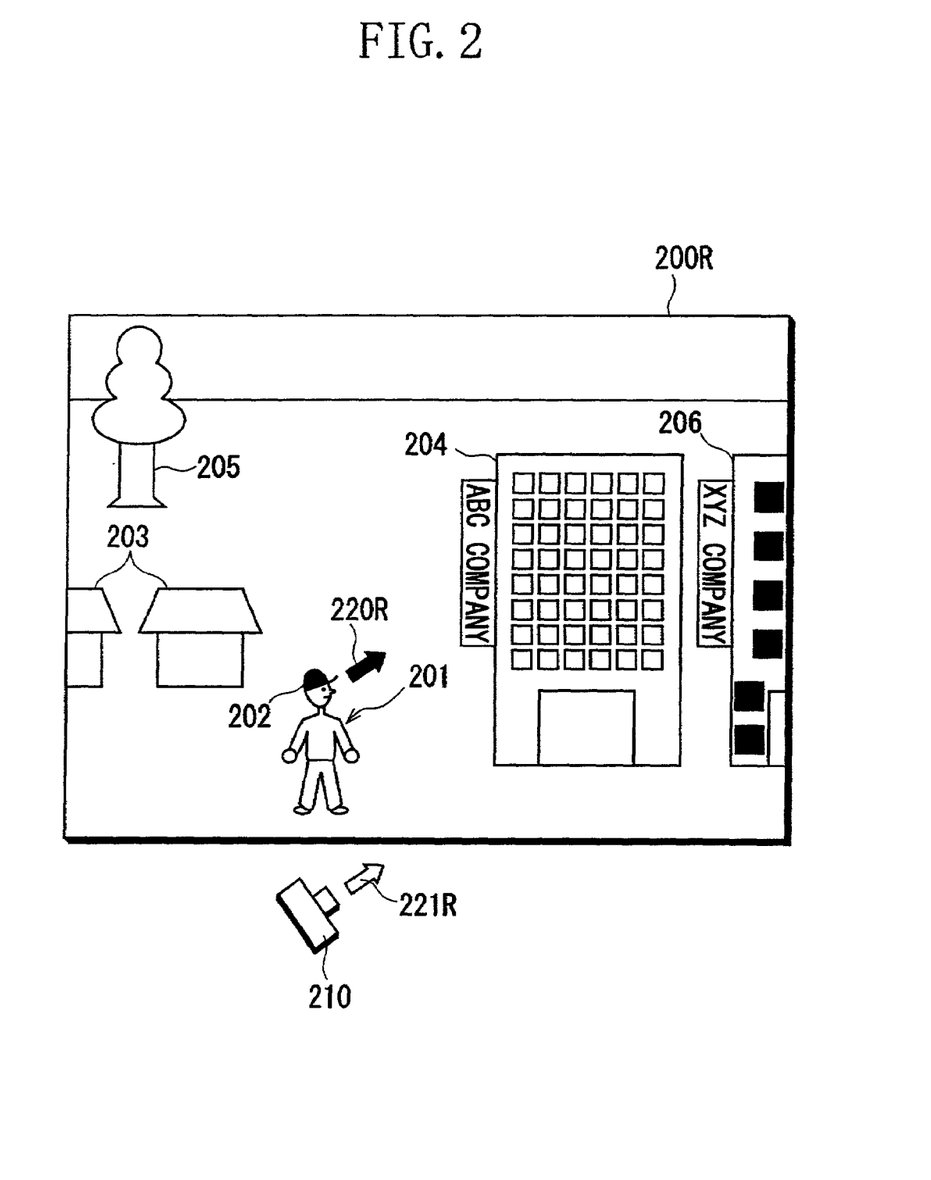
FIG. 2 is a drawing showing an example of a video game screen of the condition in which the head object part of a character faces toward the right.
Figure 3:
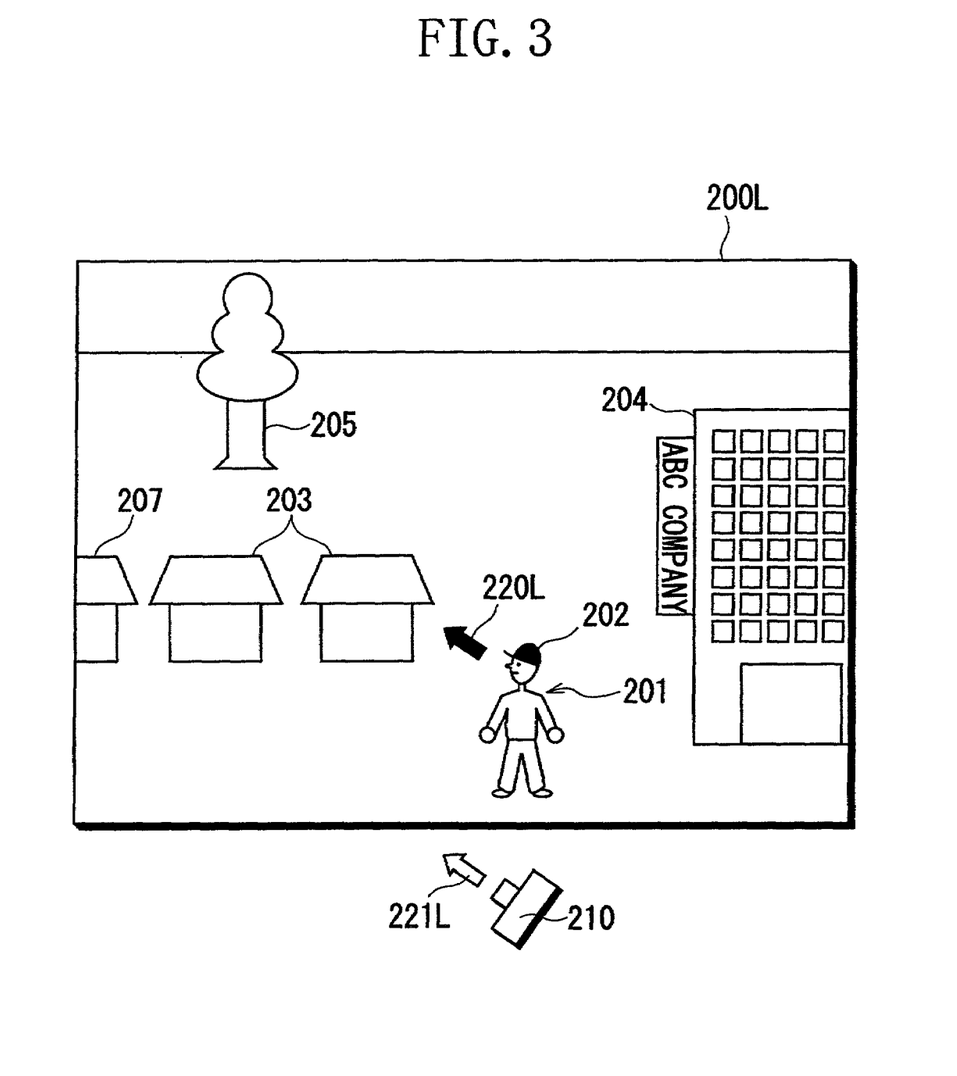
FIG. 3 is a drawing showing an example of a video game screen of the condition in which the head object part of a character faces toward the left.

FIG. 1 through FIG. 3 show the condition in virtual fields of view 200C, 200R, and 200L (with a camera field of view of, for example 120°) displayed on a monitor screen of a video game machine, in which there are disposed a main game character 201 (character object) operable by a controller, and other objects (for example, house objects 203 and 207, building objects 204 and 206, and a tree object 205 and so on). The camera 210 in FIG. 1 through FIG. 3 is a virtual camera that is capturing virtual fields of view (camera fields of view) 200C, 200R, and 200L, respectively. The camera 210 is not, it should be noted, displayed within the virtual space of the actual game.

One part of the character 201 (in this example, the head object 202) can be operated independently of the body object by a predetermined actuator on the controller. It will be understood that, in the present invention, the part that is operable by the controller is not limited to the head object 202, and can alternatively be, for example, a hand object, a leg object, a hip object, a finger object, an eye object, a mouth object or the like, and in fact can be any constituent part of the character's body. The use of the head object herein is only example for the purpose of describing an embodiment of the present invention.

The angle range of operation of the above-noted head object, that is the range of angle through which the front of the face of the character 201 can be moved is established as 60° leftward and rightward and 45° upward and downward with respect to the frontward direction of the body object of the character 201 (the frontward direction of the character before causing the orientation of the head object to change). The 60° leftward and rightward and 45° upward and downward serve as operating limits when the orientation of the head object 202 is changed. Therefore, even if there is large amount of operation of a prescribed actuator, the head object 202 will not be operated so as to exceed these operational limit angles.

The amount of operation of the prescribed actuator of the controller affects the operation speed of the head object 202. For example, in the case in which there is a large operation of the prescribed actuator, the operation speed of the head object is high, but when the amount of operation is small, the head object moves slowly. The prescribed actuator of the controller will be described in further detail below.

When the orientation of the head object 202 (orientation of the front of the face) is changed, the orientation of the neck object, the orientation of the chest object, and the orientation of the hips object are all influenced by the movement of the head object 202. The degree to which the neck, chest, and hips objects are influenced by the movement of the head object 202 is 60% for the neck object, 20% for the chest object, and 20% for the hips object. As a specific example, if the head object 202 (front of the face) is moved so as to be at an angle of 60° either to the left or to the right with respect to the frontward direction of the body object before changing the orientation of the head object 202 (this called the frontward orientation before change), the hips object has its orientation changed 12° from the frontward direction before the above change, the chest object has its orientation changed a further 12° (for a total of 24° from the frontward direction before the change), and the neck object has its orientation changed a further 36° (for a total of 60° from the frontward direction before the change). In a similar manner, if the head object 202 is moved so as to be at angle of 45° either upward or downward with respect to the frontward direction before changing the orientation of the head object 202, the hips object has its orientation changed 9° from the frontward orientation before the change, the chest object has its orientation changed a further 9° (for a total of 18° from the frontward orientation before the change), and the neck object has its orientation has its orientation changed a further 27° (for a total of 45° from the frontward orientation before the change).

Additionally, as described above, if the orientation of the head object 202 (orientation of the face) of the character 201 is changed in response to an operation of the controller, the virtual field of view (not the character field of view, but the camera field of view) is moved in response to the change in the orientation of the head object 202 (face orientation)

FIG. 1 shows an example of a virtual field of view for the case in which the orientation of the head object 202 of the character 201, as shown by the arrow 220C in the drawing, is the same orientation as the frontward orientation of the body object. In the example shown in FIG. 1, the field of view direction of the camera 210, as shown by the arrow 221C in the drawing, is the same as the orientation of the head object 202, this being the frontward direction of the body object.

In FIG. 2, we see the virtual field of view for the case in which the controller is operated by the player, so that the orientation of the head object 202 of the character 201, as shown by the arrow 220R in the drawing, is caused to change toward the right, relative to the frontward orientation of the body object. In the case of FIG. 2, the field of view direction of the camera 210, as indicated by the arrow 221R in the drawing, is the same direction (right side) as the direction of the orientation of the head object 202 (face orientation). In this condition, the image showing the virtual field of view, compared with the case of FIG. 1, shows objects farther to the right side (for example, the building object 206 in FIG. 2) but in this image objects on the left side (for example, part of the house objects 203 in FIG. 2) are hidden. That is, the image that shows the virtual field of view of the camera 210 is thought of as being what is seen when the character 201 turns his head toward the right side, so that things farther to the right are shown.

Additionally, FIG. 3 shows an example of the virtual field of view for the case in which the orientation of the head object 202 of the character 201, as shown by the arrow 220L in the drawing, is changed toward the left side with respect to the frontward direction of the body object. In this condition in FIG. 3, the image showing the virtual field of view, compared to the case of FIG. 1, shows objects farther to the left side (for example, the house object 207 in FIG. 3) but in this image objects on the right side (for example, part of the building object 204 in FIG. 3) are hidden. That is, the image that shows the virtual field of view of the camera 210 is thought of as being what is seen when the character 201 turns his head toward the left side, so that things farther to the left are shown.

It should be noted that drawings illustrating the movement of the head object 202 of the character 201 upward and downward have been omitted. For example, in the case in which the head object 202 is moved upward, the image showing the virtual field of view, compared with that shown in FIG. 1, shows the scene farther upward (for example, clouds and the like if outdoors, or the ceiling if indoors). On the other hand, if the head object 202 is moved downward, the image showing the virtual field of view, compared to that of FIG. 1, shows the scene farther downward (for example, the ground if outside or the floor if indoors).

As described above, the movement of the virtual field of view in response to a change in the direction of the head object 202 of the character 201 is made by moving the fixation point of the camera 210. That is, the movement of the virtual field of view in the game space is achieved by shifting the fixation point of the camera 210 set with respect to the center of the character in accordance with the direction of operation of the head object 202. The change of direction of the field of view of the camera can be linked to a change in the degree of perspective in the game screen, or to a change in the movement of another character.

The change in the orientation of the head object 202 of the character 201 can further be linked to an operation to change the speed or direction of movement of the character 201 itself, by means of a controller. In the case in which the movement or the like of the character 201 is linked to a change in orientation of the head object 202, it is possible, for example, to achieve a game within a game space, in which there exist items and characters that are not possible for a player to discover unless the player operates the controller so as to move the character while changing the orientation of the head object 202 of the character 201.

As described above, a character having a part that is operated is not limited to the above-described main character 201, but can also be a non-player character (NPC) that is not operable by the player. It is possible to apply a method similar to that of moving a single part of the main character 201 when it is in the playable condition to the movement of a part of an NPC.

Additionally, it is possible, for example to have one part of a character operate at the point in time at which, in accordance with the progress in a game or responsive to operation of the controller by the player, a prescribed event occurs. That is, when a prescribed event accompanies progress in the game, for example, the character head object is made to face a prescribed orientation. In the case in which the head object of a character, for example, is caused to face a prescribed orientation in response to the occurrence of prescribed event, this can be achieved similarly to the case described above, by having the movement of the virtual field of view cause the movement of the fixation point of the camera field of view. A character having a part that is caused to operate in response to the occurrence of a prescribed event can be not only the main character 201, but can also be an NPC.

The above-noted prescribed event can be, for example, a scene in a soccer game or the like in which there is eye contact between the main character and an NPC. In this manner, if a prescribed event occurs when there is eye contact between the main character and an NPC in the soccer game or the like, and the head object of the NPC or the main character is operated in response thereto, it is possible to achieve an extremely realistic game, in which game operation can be established with the assumption of team play.

As described above, the movement of one part of a character 201 (for example, orientation of the head object 202) is controllable in response to a controller operation in this video game, and further by causing the fixation point of the camera 210 to move in correspondence with a change in the orientation of the head object 202 so that the virtual field of view in the game space (not the character's viewing point, but the camera's field of view) is moved, there is a dramatic improvement in the sense of reality of the game, in comparison to previous game, in which it was merely possible to operate a part of a character by operation of a controller.

This video game not only can separately control the movement of the character 201 and the movement of one part of the character 201, but can also link the movement of the character 201 and the movement of the one part of the character 201. With this video game, therefore, it is possible for example to cause the character 201 to look back while running, or to walk while glancing to the left and right.

Additionally, this video game enables game play in which it is possible only in the case in which the movement of the character 201 is linked to change in the orientation of the head object 202, this being the case, for example, of more entertaining game play, in which there is an item or the like which cannot be discovered unless the orientation of the head object 202 of the character 201 is caused to change and the character is moved.

Video Game System

Figure 4:
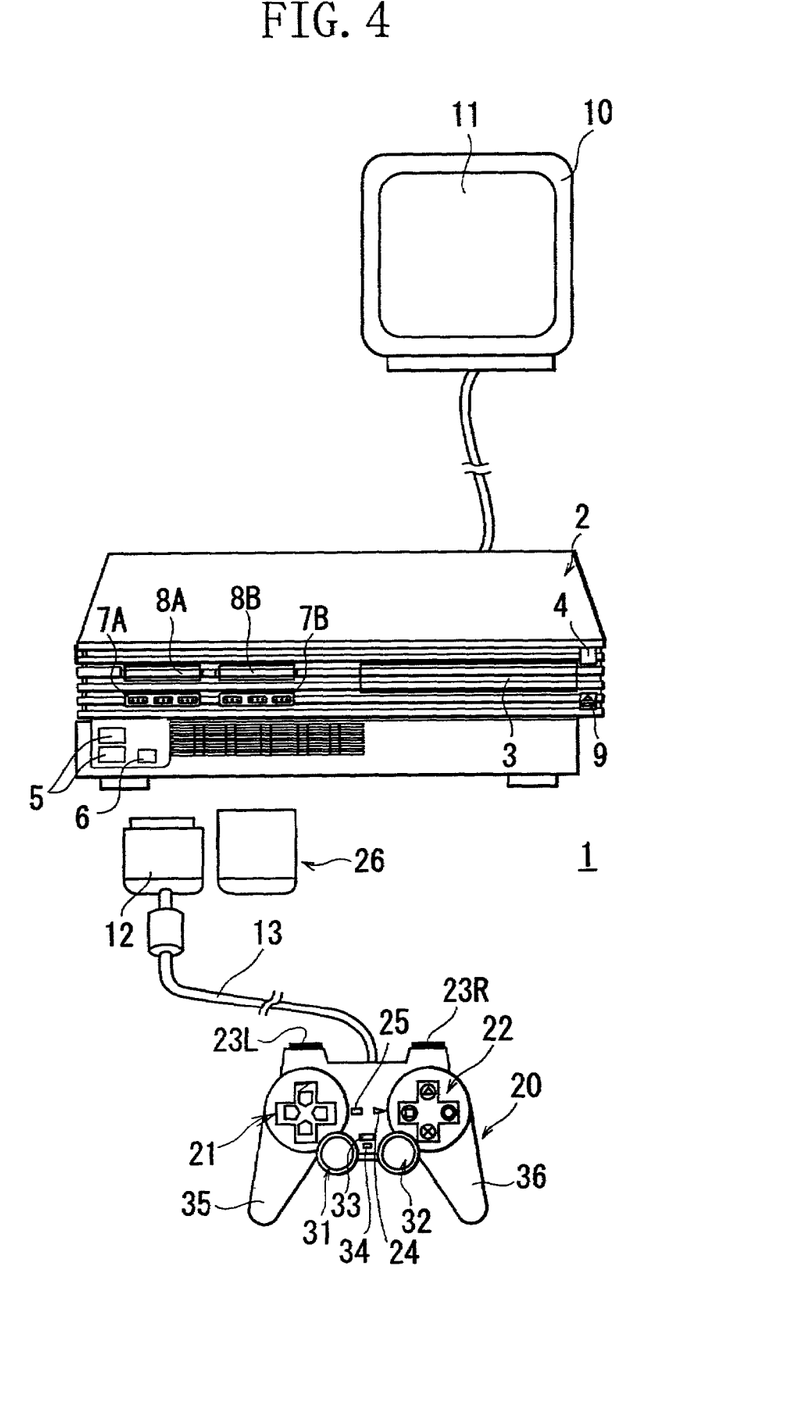
FIG. 4 is a drawing showing an example of the general configuration of a video game system, illustrating the main system elements.

FIG. 4 shows the general configuration of a video game system 1 that provides a video game such as described above.

The video game system 1 of FIG. 4 has a video game machine 2 as one example of a program execution apparatus, which not only executes the above-described video game, but also can perform playback and the like of a movie, for example, a controller 20 connected to the video game machine 2, and which is an operating terminal that is operable by a users (player), and a television monitor apparatus 10 which displays game content and images or the like and also outputs audio.

General Description of the Video Game Machine

The video game machine 2 has memory card slots 8A and 8B, controller ports 7A and 7B, a disc tray 3, buttons 4 and 9, an IEEE (Institute of Electrical and Electronics Engineers) 1394 connector 6, and a USB (Universal Serial Bus) connector 5 and the like. The memory card slots 8A and 8B are configured so as to removably accept a memory card 26. The controller ports 7A and 7B are configured to removably accept a connector 12 of a cable 13 connected to the controller 20. The disc tray 3 is configured to removably load an optical disc such as a DVD-ROM or a CD-ROM. A button 9 is an open/close button for opening and closing the disc tray 3. A button 4 is an on/standby/reset button, for switching the power supply on or placing it in standby and performing reset of a game. Although not shown, the video game machine 2 is provided on its rear panel with such elements as a power switch, an audio/video output connector (AV multi-output connector), a PC card slot, an optical digital output connector, an AC line input connector or the like.

The video game machine 2 executes a game application program (hereinafter referred to as simply a game program) read out from a storage medium of an optical disc such as the above-noted CD-ROM, DVD-ROM, also based upon instructions from a player received via the controller 20. The video game machine 2 can also execute a game program that has been downloaded from various communication lines (transfer media) via a telephone line, a LAN, a cable TV line, a communication satellite or the like.

The video game machine shown in FIG. 4 can have two controllers 20 connected at its controller ports 7A and 7B. By connecting two controllers to the video game machine 2, it is possible for two players to play a game. The memory card 26 installed in the memory card slots 8A and 8B of the video game machine 2 have stored therein various game data, generated by the execution of video games, thereby enabling to restart play of a game in progress, by reading out saved game data and using it to continue the game.

Additionally, the video game machine 2 not only executes a video game based on a game program, but also, for example, can be used for playback of audio data stored on a CD, or video and audio data (such as for a movie or the like) stored on a DVD, as well as for other operations, based on a variety of application programs. A driver program for playing back a DVD is stored, for example, in a memory card 26. The video game machine 2, therefore, reads out the driver program for playback of a DVD, and plays back the DVD in accordance with that driver program.

General Description of the Controller

The controller 20 has left grip 35, a right grip 36, a left operating part 21, a right operating part 22, a left analog operating part 31, a right analog operating part 32, a first left pushbutton 23L and a first right pushbutton 23R and, although not illustrated, a second left pushbutton and a second right pushbutton. The left grip 35 is a part that is gripped and held within the left hand, and the right grip 36 is a part that is gripped and held within the right hand, the player operating each with the thumbs of the left and right hands, respectively. The left analog operating part 31 and the right analog operating part 32 are operated as analog joysticks with the left and right thumbs in the state where the grips 35 and 36 are gripped with the left and right hands of the player. The first left pushbutton 23L and the second left pushbutton (not shown in the drawing) disposed therebelow are operated as pushbuttons by, for example, the index finger and middle finger of the player's left hand, and the first right pushbutton 23R and the second right pushbutton (not shown in the drawing) disposed there below are operated as pushbuttons by, for example, the index finger and middle finger of the player's right hand.

The above-noted left operating part 21 is provided with "up", "down", "left" and "right" direction keys, used, for example, when a player moves not a part of a character but rather the entire character on the screen. The "up", "down", "left" and "right" direction keys are used not only to issue up, down, left, and right direction commands, but can also be used for issuing commands for an oblique direction. For example, if the up key and the right key are pressed simultaneously, it is possible to issue a command for the upper-right direction. The same is true of the other direction keys. For example, if the down direction key and the left direction key are pressed simultaneously, a command is given for the lower-left direction.

The right operating part 22 has four command buttons (these buttons being respectively marked by engraved □, ∆, ×, and ○ marks), to which different functions are assigned by a game application program. For example, a menu item selection function is assigned to the ∆ button, a cancel function for canceling a selected item is assigned to the × button, and a specification function for establishing selected items is assigned to the ○ button, and a function for specifying display or non-display of a table of contents or the like is merely assigned to the □ button. It will be understood that these are merely examples of pushbutton or keys on assignments, and that various other assignments can be made.

The left analog operating part 31 and the right analog operating part 32 each have a rotational actuator, which can be tilted in an arbitrary direction about a rotational pivot point on an operating axis, and a variable analog output means, which outputs a variable analog value responsive to an operation of the rotational actuator. The rotational actuator is mounted to the end part of an operating shaft mounted so as to be restored to a neutral position by a resilient member, so that when not tilted by a player, it is restored to the upright attitude (the condition in which there is no tilt) and held in that position (reference position). The variable analog output means has, for example, a variable resistance element, the resistance value of which changes in response to operation of the rotational actuator. When the left analog operating part 31 and the right analog operating part 32 are operated so as to impart a tilt thereto, coordinate values on an XY coordinate system are detected in response to the amount of inclination with respect to the reference position and the direction of the inclination, these coordinate values being sent to the video game machine 2 as the operation output.

In this case, the video game machine 2 controls the movement of a game character on a game screen in response to the operation output signal from the left analog operating part 31 and the right analog operating part 32. That is, a prescribed actuator function is assigned to the right analog operating part 32, so that video game machine 2, in response to an operation output from the right analog operating part 32, causes one part of the character 201 during a game (for example, the head object 202) move independently of the body object. The left analog operating part 31 has assigned to it a function that is the same as the up, down, left, and right direction keys.

The controller 20 is further provided with a mode selection switch 33, a light indicator 34, a selection button 25, a start button 24 and the like. The mode selection switch 33 selects a mode to activate (analog operating mode) or inactivate (digital operating mode) the functions of the left and right operating parts 21 and 22 or the left and right analog operating parts 31 and 32. The light indicator 34 is an LED (light-emitting diode) or the like for the purpose of notifying a player of the above-noted selected operating mode by a light. The start button 24 is a pushbutton that allows a player to give a command to start a game or playback, or to pause. The selection button 25 is for a player to give a command to cause display on a monitor screen 10 of a menu or an operating panel. If the mode selection switch 33 is used to select the analog operating mode, the light indicator 34 is controlled so as to flash, and the left and right analog operating parts 31 and 32 become operative, but if the digital operating mode is selected, the light indicator 34 is extinguished and operation of the left and right analog operating parts 31 and 32 is disabled.

When the various buttons and operating parts provided on the controller 20 are operated by the player, the controller 20 generates an operating signal corresponding to the operation, this operating signal being sent to the video game machine 2 via a cable 13, a connector 12, and a controller port 7.

In addition, controller 20 is provided within the left and right grips 35 and 36 with a vibration generating mechanism, which generates a vibration, for example by causing a weight that is eccentrically disposed with respect to a motor to rotate, thereby enabling operation of the vibration generating mechanism in response to a command from the video game machine 2. That is, there is a function that, by causing the vibration generating mechanism to operate, imparts vibration to the hand of the player.

Internal Configuration of the Video Game Machine

Figure 5:
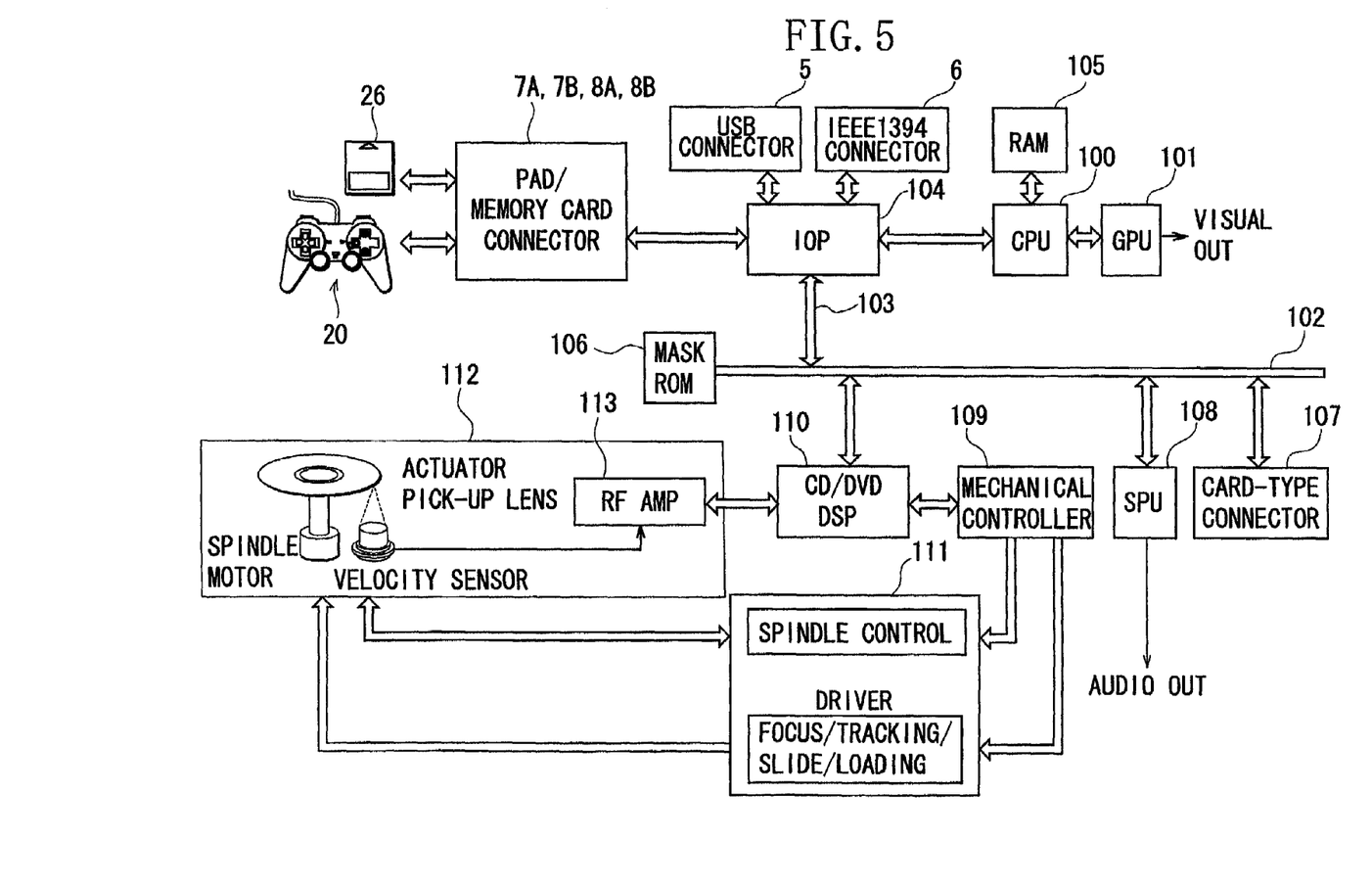
FIG. 5 is a drawing showing an example of the general internal configuration of a video game machine.

Next, an outline of internal circuitry configuration of the video game machine will be described using FIG. 5.

The video game machine 2 has a main CPU 100, a graphic processor unit (GPU) 101, an I/O processor (IOP) 104, an optical disc playback unit 112, a main memory (RAM) 105, a MASK ROM 106, and a sound processor unit (SPU) 108 and the like. The main CPU 100 performs control of the signal processor and internal constituent elements, in accordance with various application programs which realize the foregoing video games. The graphic processor unit 101 performs image processing. The I/O processor IOP 104 performs interface processing between the external and internal devices, and processing to maintain downward compatibility. The main memory 105 has the functions of a working area for the main CPU 100, and a buffer for temporary storage of data read out from an optical disc. The MASK-ROM 106 stores an initialization program for the video game machine 2, and a program (called a handler) for interrupting the processing of the CPU 100 and I/O processor 104 when various switches and buttons are pressed so as to execute processing responsive to the operation of the switch or button. The SPU 108 performs sound signal processing. The optical disc playback unit 112 performs playback of an optical disc such as a DVD or CD or the like, onto which is stored an application program or a multimedia data. The optical disc playback unit 112 is made up of a spindle motor, an optical pickup, an RF amplifier 113, and a slide mechanism and the like. The spindle motor causes the DVD or other optical disc to rotate. The optical pickup reads a signal recorded on an optical disc. The slide mechanism causes the optical disc to move in a radial direction with respect to an optical disc. The RF amplifier 113 amplifies an output signal from the optical pickup.

The video game machine 2 further has a CD/DVD digital signal processor 110 (hereinafter referred to simply as the DSP 110), a driver 111, a mechanical controller 109, and a card-type connector 107 (here in after referred to simply as the PC card slot 107). The DSP 110 converts the output signal from the RF amplifier 113 of the optical disc playback unit 112 to binary form, and applies error correction processing (CIRC processing) and expansion decoding processing thereto, so as to play back the signal recorded on the optical disc. The driver 111 and the mechanical controller 109 perform rotational control of the spindle motor of the optical disc play back unit 112, and focus and tracking control of the optical pickup. The PC card slot 107 is an interface device for the purpose of making connection, for example, to a communication card or to an external hard disk drive.

Each of the above-noted constituent elements are mutually connected via bus lines 102, 103, and the like. The main CPU 100 and GPU 101 are connected by means of a dedicated bus. The connection between the main CPU 100 and the IO processor 104 is made by SBUS. The connection between the IO processor 104 and the DSP 110, the MASK ROM 106, the sound processor unit 108, and the PC card slot 107 is made by the SBUS.

The main CPU 100, by executing an initialization program or an operating system program for the main CPU stored in the MASK ROM 106, controls the overall operation of the video game machine 2. The main CPU 100, by executing various application programs including the game application program for executing the video game, controls various operations in the video game machine 2. These various application programs are read out from an optical disc such as a CD-ROM or DVD-ROM and loaded into the main memory 105, or downloaded via a communication network.

The I/O processor 104, by executing an operating system program for an I/O processor stored in the MASKROM 106, performs such tasks as input and output between PAD and memory card connectors 7A, 7B, 8A, and 8B, input and output of data at the USB connector 5, input and output of data at the PC card slot, and data protocol conversion of this data. Note that the MASK ROM 106 stores a device ID of the video game machine 2.

The graphic processor unit 101 functions as a geometry transfer engine for performing processing of coordinate conversion and a rendering processor, and performs plotting in accordance with graphic commands from the main CPU 100, storing the plotted graphics in a frame buffer. For example, the graphic processor unit 101, in serving as a geometric transfer engine, in the case in which various application program stored on an optical disc uses so-called three-dimensional (3D) graphics, performs geometry calculation processing, so as to perform coordinate calculation of polygons for forming three-dimensional objects. Additionally, by performing rendering processing, the graphic processor unit 101 performs various calculations for generating an image possibly obtained by photographing such three-dimensional objects with a virtual camera that is perspective conversion for rendering (i.e., calculation of coordinate values of the vertexes of the individual polygons composing a three-dimensional image projected on to a virtual camera screen), and the final calculated image data being written into a frame buffer. The graphic processor unit 101 outputs a video signal responsive to these generated images.

The sound processor unit 108 has functions such as an ADPCM (adaptive differential pulse code modulation) decoding function and an audio signal playback function. The ADPCM decoding function is a function that decodes audio data by adaptive prediction. The audio playback function reads waveform data stored in a sound buffer (not shown in the drawing) that is built in or is externally connected to the SPU 108, so as to play back and output an audio signal such as sound effects. The waveform data stored in the sound buffer is modulated so as to generate various sound waveform data. That is, the SPU 108 based on instructions from the main CPU 100, plays back an audio signal of music and sound effects of waveform data stored in the sound buffer, and operates as a so-called sampling sound source.

In an entertainment system 2 having the above-noted configuration, when for example the power supply is switched on, an initialization program for the main CPU 100 and an operating system program for the I/O processor 104 are each read out of the MASK ROM 106 and, the main CPU 100 and the I/O processor 104 executing these respective operating system programs. By doing this, the main CPU 100 performs overall management of the various parts of the video game machine 2. The I/O processor 104 also controls input and output with the memory card 26. When the main CPU 100 executes the operating system program, after performing initialization processing, such as verification of operation conditions, the main CPU 100 controls the optical disc playback section 112, so as to read out an application program stored on an optical disc and, after loading into the main memory 105, and executes the application program. By executing the application program, the main CPU 100, in response to instructions from the player through the controller 20 via the I/O processor 104, controls the graphic processor unit 101 and the sound processor unit 108, so as to control image display, and control playback of sound effects and music. In this video game machine 2, the case in which playback is done of a movie or the like stored on an optical disc is similar, the main CPU 100 performing control of the graphic processor unit 101 and the sound processor unit 108, in accordance with the instructions (commands) from the player through the controller 20 via the I/O processor 104, so as to control image display of the movie, and control the playback of sound effects and music and the like.

General Configuration of a Game Program

A game program for creating a video game in which it is at least possible to move one part of a character and also move the camera field of view in response to operation of the controller 20 is described below.

Figure 6:
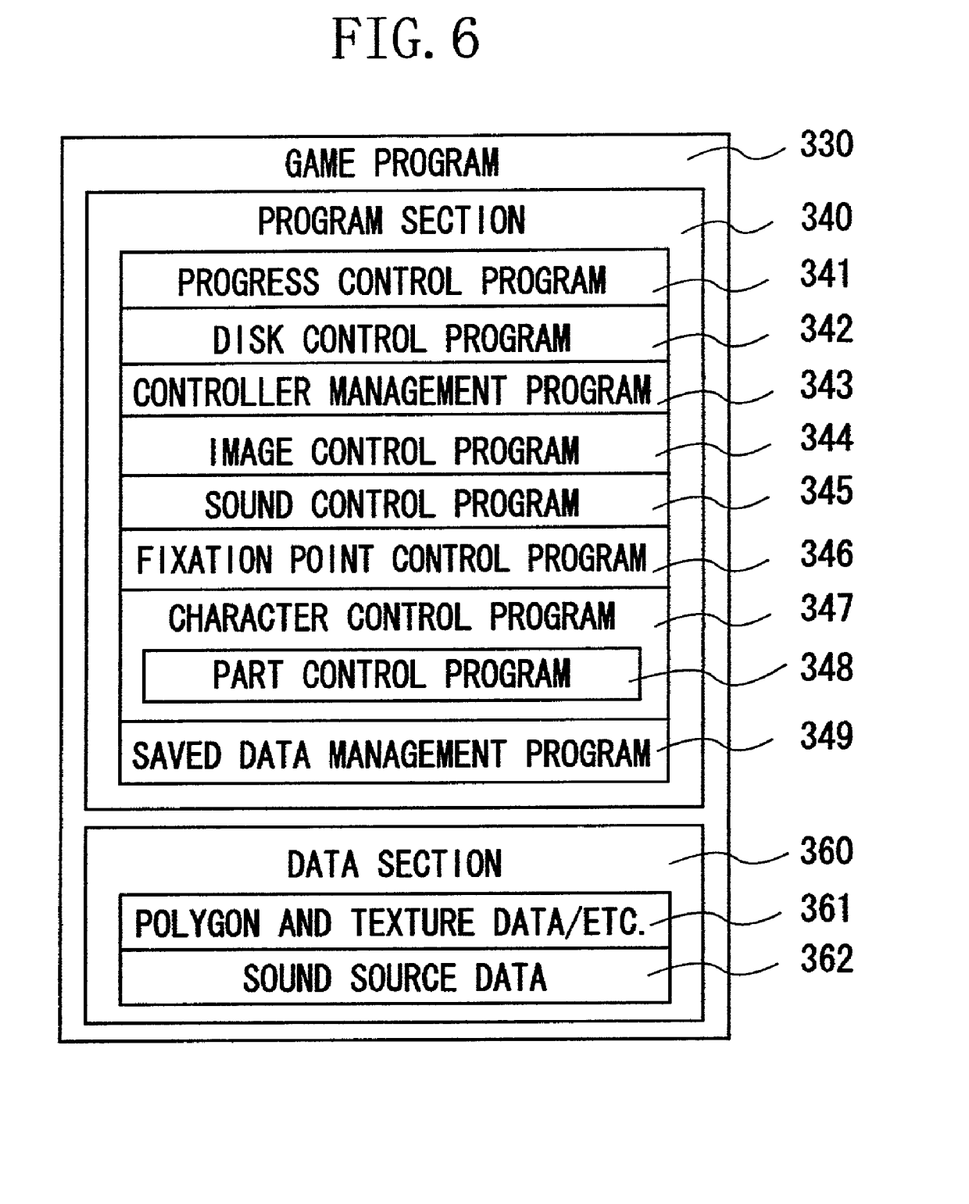
FIG. 6 is a drawing used to illustrate the data structure in a game program.

The game program is recorded on a recording medium such as a DVD-ROM, CD-ROM, or other optical disc, or on in a semiconductor memory, and can be downloaded via a transfer medium of a communication network or the like, and has a data structure such as shown, for example, in FIG. 6. The data structure shown in FIG. 6 merely conceptually presents the main parts of a program section and data section included in a game program, and does not indicate the configuration of an actual program.

As shown in FIG. 6, a game program 330 can be divided into a program section 340, for the purpose of execution by the main CPU 100 of the video game machine 2, and data section 360, having various data used in the execution of the video game.

The data section 360 minimally has polygon and texture data 361 and sound source data 362 as the various data used in executing the video game.

The polygon texture data 361 is data for generating polygons and textures for generating main characters, NPC objects, background images, and other objects during a video game. The sound source data 362 is waveform data used when the sound processor unit 108 of the video game machine 2 shown in FIG. 5 generates game sounds, music, and sound effects.

The program section 340 is a program for executing the video game, and minimally has a progress control program 341, a disc control program 342, a controller management program 343, an image control program 344, a sound control program 345, a fixation point control program 346, a character control program 347, and a saved data management program 349.

The game progress control program 341 is for the purpose of controlling the progress of the video game. The disc control program 342 is for the purpose of controlling data readout from the optical disc or from an HD drive, in response to the start of and progress of a video game. The controller management program 343 is for the purpose of managing input signals responsive to pushing of buttons or operating of the left and right analog operating parts on the controller 20 by a player, and managing the controller 20 operating mode and vibration generation and the like. The image control program 344 is a program for the purpose of generating a game image and displaying the game image on a television monitor. The sound control program 345 is a program for generation and output of sounds and music during a game.

The fixation point control program 346 is a program for controlling the fixation point when the virtual field of view (camera field of view) is caused to move. The character control program 347 is a program for controlling the operation and the like of game characters, this character control program 347 encompassing a part control program 348, which is a control program for moving one part of a character, for example the head object 202 of the character 201 as described earlier. In addition, the saved data management program 349 is a program for the purpose of causing saving and readout to/from the memory card 26 of data such as game point counts and intermediate game data generated by execution of the video game and managing this saved data.

Flow of Game Program Execution

The flow of the main processing in the game program shown in FIG. 6 is described below in relation to the flowcharts shown in FIG. 7 and FIG. 8. The flow in the flowcharts described below is achieved by running the various program sections of the game program in the main CPU 100 within the video game machine 2. In the description to follow, the operation of one part of a character (for example the head object 202) and the movement of the camera field of view are controlled in response to operation of the right analog operating part 32 of the controller 20, this being a feature of the present invention.

Flow of Control of One Part of a Character and of the Camera Field of View

Figure 7:
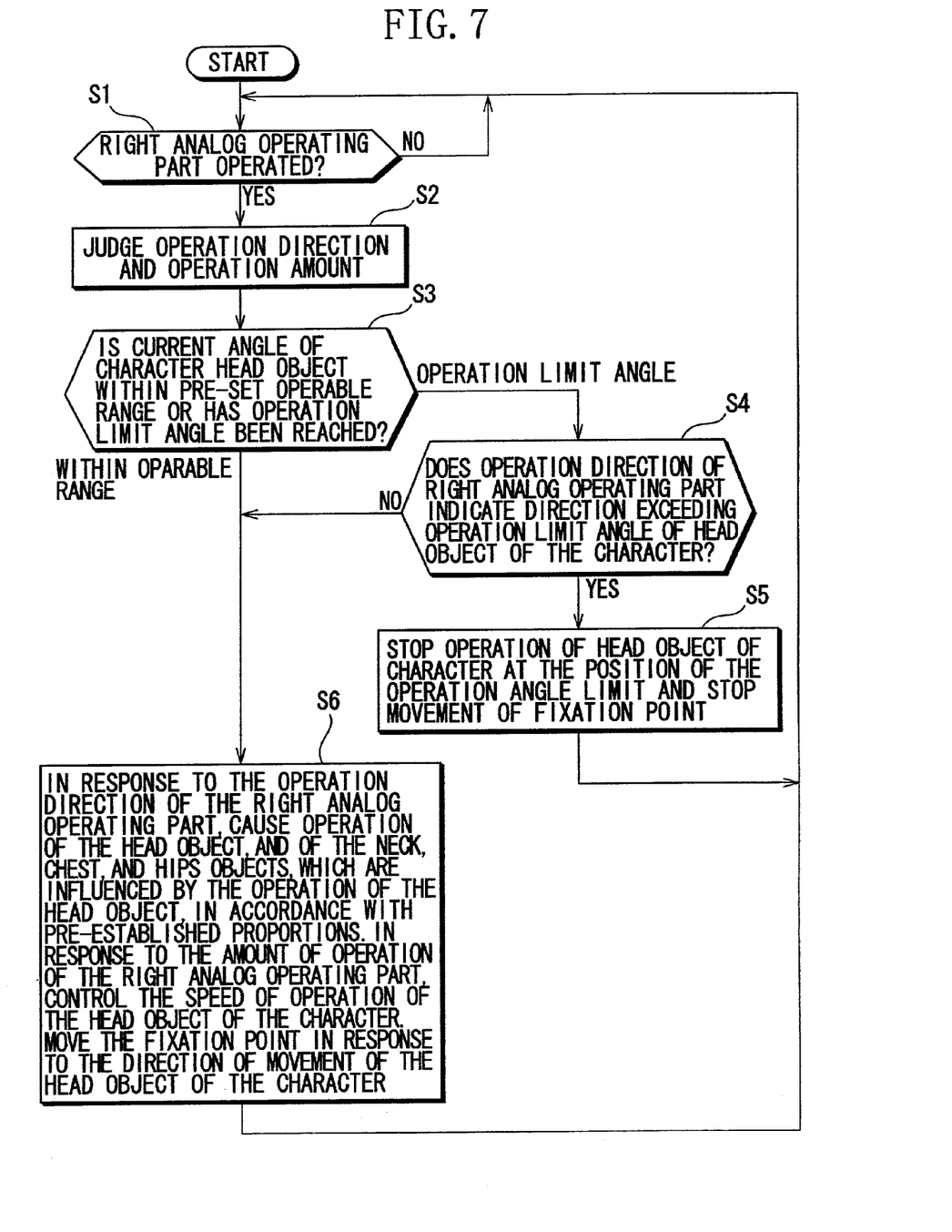
FIG. 7 is a flowchart showing the flow of processing which achieves movement of the head object part of a character and movement of the camera field of view, in response to an operation at a right analog operating part of a controller.

FIG. 7 shows the flow of processing when the game program 330, in response to operation of a prescribed actuator (the right analog operating part 32 of the controller 20), moves the head object 202 of the character 201, and also causes movement of the camera field of view.

In FIG. 7, as the processing at step S1, the controller management program 343 monitors the operating condition of various buttons and operating parts of the controller 20. If a judgment is made at step S1 that the right analog operating part 32 of the controller 20 has been operated, the controller management program 343, as the processing of step S2, makes a judgment as to the direction and amount of operation of the right analog operating part 32.

Next, as the processing of step S3, the character control program 347, based on information indicating the direction and amount of operation of the right analog operating part 32, makes a judgment as to whether or not the current angle of the head object 202 of the character 201 is within a pre-set operable range and whether or not it has reached an operating limit angle. If the judgment is made at step S3 that the current angle of the head object 202 is within the operable angle range, game program processing proceeds to step S6. If, however, the judgment at step S3 is that the current angle of the head object 202 is at the operating limit angle, the processing of the game program proceeds to step S4.

In the case of proceeding to step S6, the character control program 347 and the part control program 348, in response to the operation direction of the right analog operating part 32, cause operation of the head object 202, and of the neck, chest, and hips objects, the operation of which are influenced by the operation of the head object 202, with respective pre-established proportions. Specifically, the programs 347 and 348 cause operation of the head object 202 and in response to the operation of the head object 202, cause 60% operation of the neck object, 20% operation of the chest object, and 20% operation of the hips object. Simultaneously with this, the programs 347 and 348 also control the speed of operation of the head object 202 of the character 201 in response to the amount of operation (analog value) of the right analog operating part 32.

At step S6, the fixation point control program 346, in response to the operating direction of the head object 202 of the character 201, performs processing so as to move the virtual field of view in the game space (that is, so as to move the fixation point of the camera 210). By doing this, movement of the virtual field of view occurs within the game space. After the processing at step S6, the flow of processing returns to step S1.

If the judgment is made at step S3, however, that the angle has reached the operating angle limit, so that the flow of processing jumps to step S4, the character control program 347 makes a judgment as to whether or not the direction of operation of the right analog operating part 32 indicates that the operating angle limit of the head object 202 of the character 201 is exceeded.

At this point, in the judgment processing performed at step S4, if the judgment is made that the direction of operation of the right analog operating part 32 indicates that the operating angle limit of the head object 202 is not exceeded, that is, if it indicates a direction that is opposite from the direction exceeding the operating angle limit, the processing of the game program proceeds to step S6. On the other hand, if the judgment processing at step S4 indicates that the direction of operation of the right analog operating part 32 is such as to exceed the operating angle limit of the head object 202, processing of the game program proceeds to step S5.

When the processing of step S5 is encountered, the character control program 347 and the part control program 348 cause the operation of the head object 202 to stop at the position of the operating angle limit and the fixation point control program 346 stops the movement of the virtual field of view (movement of the fixation point of the camera 210) in the game space, whereupon return is made to step S1.

Figure 8:
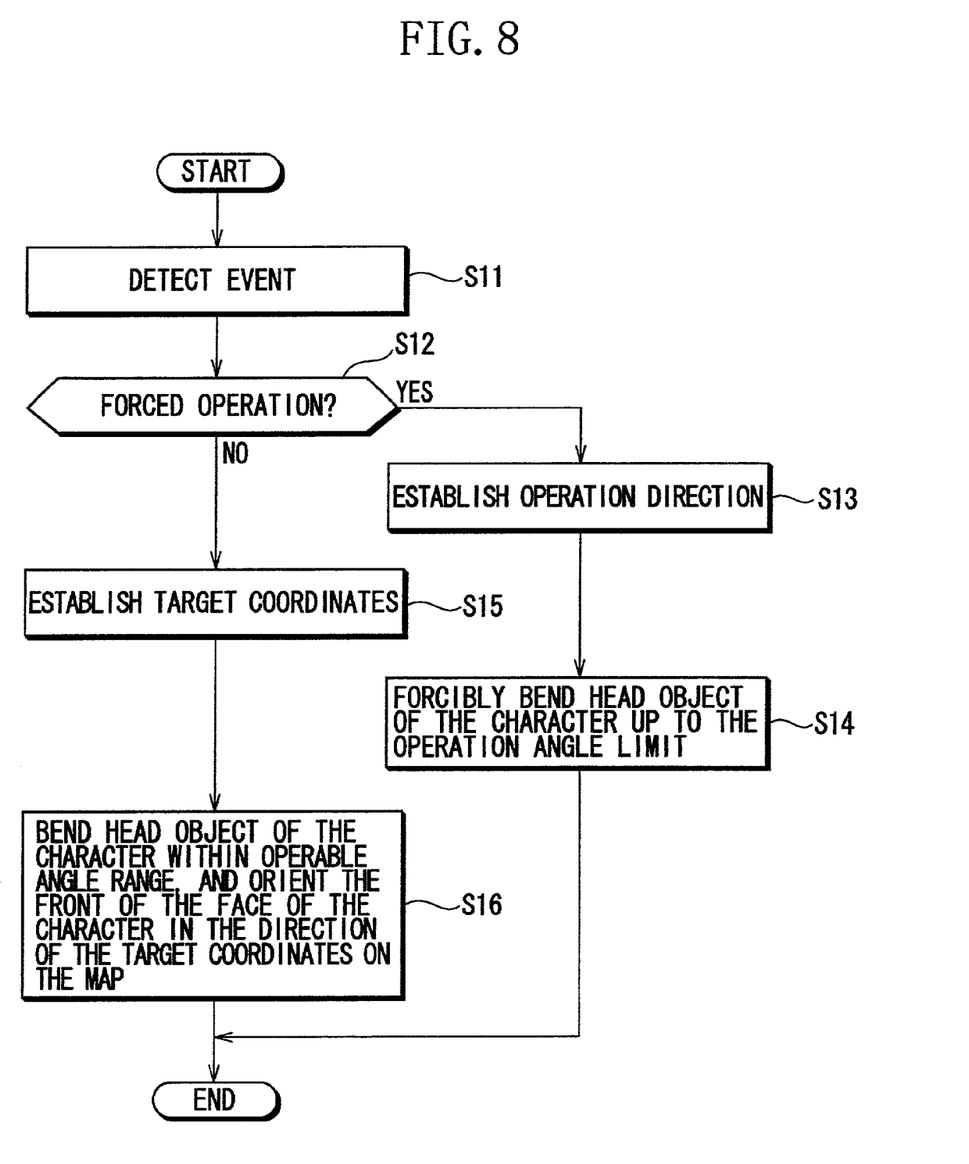
FIG. 8 is a flowchart showing the flow of processing in a case in which operation control of a character is performed in response to the generation of an event.

Flow of Character Operation Processing in Response to the Occurrence of an Event FIG. 8 shows the flow of processing in the case when, upon the occurrence of a prescribed event accompanying progress in the game, for example, the game program 330 moves one part (the head object) of a character in a prescribed direction. The character in the example of FIG. 8 is not restricted to a main character, but can also be an NPC.

Referring to FIG. 8, when the progress control program 341 detects the occurrence of a prescribed event with the progress of the game at step S11, as the processing of step S12, it performs a judgment as to whether or not control of the character operation set with regard to the event forcibly moves the head object of the character. If at step S12 the judgment is made that the forced operation is to be made, the processing of the game program proceeds to step S13. If at step S12 the judgment is made, however, that the event does not cause forced movement, the flow of processing proceeds to step S15.

In the case in which processing proceeds to step S13, the character control program 347 and the part control program 348 establish the direction of operation of the head object of the character, after which, as the processing of step S14, the head object of the character is forcibly bent in this operating direction up to the operating angle limit.

If at step S12 the judgment is made, however, that forcible movement is not to be done, so that processing proceeds to step S15, the programs 347 and 348 establish the target coordinates for movement of the head object of the character. The target coordinates in this case can be envisioned as being, for example, the desired coordinates on a map of the game space, or the coordinates at which another character exists, in the case in which the orientation of the head object is changed by the character so as to bring the other character into view. In the case in which a character changes the orientation of its head object so as to view anther character, the other character that comes into view is not restricted to being an NPC as seen by a main character, but can also include a main character as seen from an NPC.

After the coordinates are established as noted above, the programs 347 and 348, as the processing at step S16, bend the head object of the NPC within the operating angle limit thereof as described above, so that the front of the face of the character is oriented toward the above-noted established direction.

As described above, the video game machine 2, in response to operation of the right analog operating part 32 of the controller 20 or the occurrence of an event, controls the orientation of the head object 202 of the character 201, and also moves the fixation point of the camera 210, so as to cause the virtual field of view (camera field of view) to move in the game space, thereby achieving a game with a much higher level of reality compared with video games in the past.

Because the video game machine 2 links the movement of the character 201 with the orientation of the head object 202, it is possible to achieve a high level of entertainment.

Finally, it should be noted that the foregoing embodiment is merely an exemplary form of the present invention, to which the present invention is not restricted, and that the present invention can take other various forms, within the scope of the technical concept thereof, but different from the foregoing described embodiments.

What is claimed is:

1. A virtual space control method comprising the steps of:
changing an orientation of a prescribed part of a virtual character in a virtual space; changing a screen image in response to the change in orientation of the prescribed part, wherein the screen image represents a virtual field of view of the virtual space defined by a viewpoint other than a viewpoint of the virtual character and including a whole image of the virtual character;
moving the virtual character in the virtual space; and
detecting an occurrence of a prescribed event,
wherein the step of changing the orientation includes a step of changing the orientation of the prescribed part in response to the occurrence of the prescribed event,
wherein the step of changing the screen image has a step of changing the screen image in response to the movement of the virtual character and to the change in orientation of the prescribed part, and
wherein the prescribed event is selected from a plurality of events occurring in the virtual space.

2. The virtual space control method according to claim 1, wherein
the step of changing the orientation of the prescribed part includes the step of changing the orientation of a head of the virtual character as the change in orientation of the prescribed part, and
the step of changing the screen image includes the step of changing the viewpoint defining the virtual field of view in response to the change in orientation of the head of the virtual character.

3. The virtual space control method according to claim 1, further comprising the step of:
receiving a operation command input from the virtual character, wherein the step of changing the orientation includes a step of changing the orientation of the prescribed part in response to an operation command input.

4. The virtual space control method according to claim 1, further comprising the step of:
generating a prescribed object in the virtual space only when a the movement of me virtual character occurs, and the orientation of the prescribed part is changed in a prescribed manner.

5. The virtual space control method according to claim 1, further comprising the step of:
setting target coordinates in the virtual space,
wherein the step of changing the orientation includes a step of changing the orientation of the prescribed part of the virtual character toward the target coordinates.

6. The virtual space control method according to claim 1, further comprising the step of:
setting a limit to an orientation changeable range of the prescribed part of the virtual setting character.

7. The virtual space control method according to claim 1, further comprising the step of:
causing a change in orientation of another part of the virtual character influenced by the change in orientation of the prescribed part, the change in orientation of said another part being made in a pre-established prescribed proportion to the change in orientation of the prescribed part.

8. The virtual space control method according to claim 1, wherein the virtual character comprises the prescribed part, a first part, and a second part,
wherein the prescribed part is connected to the first part,
wherein the first part is connected to the second part,
wherein, when the prescribed part moves at a first angle, the first part moves at a second angle, and the second part moves at a third angle, and
wherein the first angle is not less than the sum of the second angle and the third angle.

9. The virtual space control method according to claim 8, wherein
a ratio of the second angle to the first angle is established.

10. The virtual space control method according to claim 8, wherein
a ratio of the third angle to the first angle is established.

11. A computer-readable recording medium having recorded therein a virtual space control program to be executed on a computer, the virtual space control program being configured to execute the steps of:
changing an orientation of a prescribed part of a virtual character in a virtual space;
moving the virtual character in the virtual space;
changing a screen image in response to the change in orientation of the prescribed part and the movement of the virtual character in the virtual space, wherein the screen image represents a virtual field of view defined by a viewpoint other than a viewpoint of the virtual character and includes a whole image of the virtual character; and
detecting occurrence of a prescribed event,
wherein the step of changing the orientation of the prescribed part includes a step of changing the orientation of the prescribed part in response to the occurrence of the prescribed event, and
wherein the prescribed event is selected from a plurality of events occurring in the virtual space.

12. The computer-readable recording medium having recorded therein the virtual space control program to be executed on a computer according to claim 11, wherein the step of changing the orientation of the prescribed part includes the step of changing the orientation of a head of the virtual character as the change in orientation of the prescribed part, and
the step of changing the screen image includes the step of changing the viewpoint defining the virtual field of view in response to the change in orientation of the head of the virtual character.

13. The computer-readable recording medium having recorded therein the virtual space control program to be executed on a computer according to claim 11, the virtual space control program being further configured to execute the step of:
receiving an operation command input from the virtual character,
wherein the step of changing the orientation of the prescribed part includes a step of changing the orientation of the prescribed part in response to the operation command input.

14. The computer-readable recording medium having recorded therein the virtual space control program to be executed on a computer according to claim 11, the virtual space control program being further configured to execute the step of:
generating a prescribed object in the virtual space only when the movement of the virtual character occurs, and the orientation of the prescribed part is changed in a prescribed manner.

15. The computer-readable recording medium having recorded therein the virtual space control program to be executed on a computer according to claim 11, the virtual space control program being further configured to execute the step of:
setting target coordinates in the virtual space,
wherein the step of changing the orientation includes a step of changing the orientation of the prescribed part of the virtual character toward the target coordinates.

16. The computer-readable recording medium having recorded therein the virtual space control program to be executed on a computer according to claim 11, the virtual space control program being further configured to execute the step of:
setting a limit to an orientation changeable range of the prescribed part of the virtual character.

17. The computer-readable recording medium having recorded therein the virtual space control program to be executed on a computer according to claim 11, the virtual space control program being further configured to execute the step of:
causing a change in orientation of another part of the virtual character influenced by the change in orientation of the prescribed part, the change in orientation of said another part being made in a pre-established prescribed proportion to the change in orientation of the prescribed part.

18. A program execution apparatus that executes a virtual space control program, the virtual space control program being configured to perform the steps of:
changing an orientation of a prescribed part of a virtual character in a virtual space;
changing a screen image in response to the change in orientation of the prescribed part and the movement of the virtual character in the virtual space, wherein the screen image represents a virtual field of view defined by a viewpoint other than a viewpoint of the virtual character and includes a whole image of the virtual character; and detecting an occurrence of a prescribed event, wherein the step of changing the orientation includes a step of changing the orientation of the prescribed part in response to the occurrence of the prescribed event, and wherein the prescribed event is selected from a plurality of events occurring in the virtual space.

19. The program execution apparatus according to claim 18, wherein the step of changing the orientation of the prescribed part includes the step of changing the orientation of a head of the virtual character as the change in orientation of the prescribed part, and the step of changing the screen image includes the step of changing the viewpoint defining the virtual field of view in response to the change in orientation of the head of the virtual character.

20. The program execution apparatus according to claim 18, the virtual space control program being further configured to perform the step of:

receiving a operation command input from the virtual character, wherein the step of changing the orientation includes a step of changing the orientation of the prescribed part in response to an operation command input.

21. The program execution apparatus according to claim 18, the virtual space control program being further configured to perform the step of:

generating a prescribed object in the virtual space only when the movement of the virtual character occurs, and the orientation of the prescribed part is changed in a prescribed manner.

22. The program execution apparatus according to claim 18, the virtual space control program being further configured to perform the step of:

setting target coordinates in the virtual space, wherein the step of changing the orientation includes a step of changing the orientation of the prescribed part of the virtual character toward the target coordinates.

23. The program execution apparatus according to claim 18, the virtual space control program being further configured to perform the step of:

setting a limit to an orientation changeable range of the prescribed part of the virtual character.

24. The program execution apparatus according to claim 18, the virtual space control program being further configured to perform the step of:

causing a change in orientation of another part of the virtual character influenced by the change in orientation of the prescribed part, the change in orientation of said another part being made in a pre-established prescribed proportion to the change in orientation of the prescribed part.

25. A computer, that executes a virtual space control program, the virtual space control program being configured to perform the steps of:

changing an orientation of a prescribed part of a virtual character in a virtual space;

moving the virtual character in the virtual space;

changing a screen image in response to the change in orientation of the prescribed part and the movement of the virtual character in the virtual space, wherein the screen image represents a virtual field of view defined by a viewpoint other than a viewpoint of the virtual character and includes a whole image of the virtual character; and detecting an occurrence of a prescribed event, wherein the step of changing the orientation includes a step of changing the orientation of the prescribed part in response to the occurrence of the prescribed event, and wherein the prescribed event is selected from a plurality of events occurring in the virtual space.

* * * * *